United States Patent Office 3,264,346
Patented August 2, 1966

3,264,346
PROCESS FOR THE PRODUCTION OF AQUEOUS SOLUTIONS OF PURE LOWER ALIPHATIC PERCARBOXYLIC ACIDS
Otto Weiberg, Frankfurt am Main, Germany, assignor to Deutsche Gold- und Silber-Scheideanstalt vormals Roessler, Frankfurt am Main, Germany
No Drawing. Filed Jan. 24, 1963, Ser. No. 253,739
Claims priority, application Germany, Aug. 6, 1960, D 33,967; Feb. 1, 1962, D 38,047
6 Claims. (Cl. 260—502)

This is a continuation-in-part application of application Serial No. 127,491, filed July 28, 1961, now abandoned.

The present invention relates to an improved process for the production of aqueous solutions of pure lower aliphatic percarboxylic acids, such as peracetic acid, perpropionic acid and perbutyric acid and the like, which are free of impurities which usually occur in such percarboxylic acids produced by previously known methods. Among such impurities which are disturbing are acid catalyst residues, the corresponding aliphatic carboxylic acid from which the percarboxylic acid is produced, such as acetic acid, and hydrogen peroxide, as such impurities cause side reactions in epoxydation reactions carried out with the free acids.

As recently as Chem. Eng. News, July 4, 1960, pages 48–49, it was indicated that previously there has been no practical way for producing peracetic acid free of impurities which disturb epoxydations. No technical process is known for the economical production of pure peracetic acid from acetic acid and hydrogen peroxide. The freezing out process does not come into consideration for technical production in view of its high cost and in view of the dangers involved.

The best known method for the production of percarboxylic acids from carboxylic acids such as acetic acid and hydrogen peroxide consists in mixing both reactants in the presence of acid catalysts, especially, sulfuric acid. In view of the equilibrium reaction involved a relatively large excess of carboxylic acid must be employed in the interest of obtaining good yields of percarboxylic acid. Also, for the same reason, it is general to use as concentrated hydrogen peroxide as possible, preferably, 90% hydrogen peroxide. In any case, an equilibrium mixture is produced which in addition to percarboxylic acid contains about the same quantity of starting carboxylic acid, as well as hydrogen peroxide, water and the acid catalyst, usually, sulfuric acid. The yield of peroxidic oxygen, for example, with reference to percarboxylic acid in view of location of the equilibrium is only about 77% of the theoretical. The addition of carboxylic acid anhydride is recommended for the removal of water and hydrogen peroxide. While such addition removes both of these equilibrium components it does not remove the acid catalyst and in addition increases the quantity of carboxylic acid. In addition, the production of the highly explosive diacetyl peroxide must be reckoned with, for example, in the production of peracetic acid.

It has also been proposed to avoid the difficulties in producing equilibrium percarboxylic acid by removing water from the equilibrium mixture by the addition of large quantities of water removing agents, usually by the addition of large quantities of sulfuric acid, and to distill off the percarboxylic acid under vacuum. This process, however, cannot feasibly be carried out economically as, for 100 parts of 30 to 40% hydrogen peroxide, about 100 parts by weight of concentrated sulfuric acid are required and long reaction periods are also required. The mixture with the sulfuric acid is effected under ice cooling and the mixture is allowed to stand for about 20 hours before it is distilled. It is quite evident that such a process is very costly.

As a further possibility of shifting the equilibrium in favor of percarboxylic acid production, the removal of water with the aid of an azeotropic entraining agent has been recommended. It is found, however, that such an operation requires an inadmissibly long time to be practically usable and as a result requires large apparatus units. For example, to carry out such a distillation operation requires 8–10 hours. In addition, the results are also unsatisfactory in that the solutions of the percarboxylic acid in organic solvents produced are not free of carboxylic acid, hydrogen peroxide and catalyst acid.

According to the invention it was found that solutions of pure peracetic acid as well as other lower aliphatic percarboxylic acids in water which are free of carboxylic acid, hydrogen peroxide and acid catalyst can be produced technically in a very simple manner by reacting hydrogen peroxide and the carboxylic acid in the presence of an acid catalyst while maintaining the molar ratio of hydrogen peroxide to carboxylic acid substantially greater than 1:1 and distilling the peracetic acid produced together with water off from the reaction mixture. It has been found particularly advantageous if the molar ratio of hydrogen peroxide to carboxylic acid is between 5:1 and 15:1. It was not to have been foreseen that the distillate from a mixture which contains an excess of hydrogen peroxide over carboxylic acid would be free of even traces of hydrogen peroxide.

The reaction is carried out at temperatures between 20 to 80° C., preferably, between 40 and 65° C.

The process according to the invention can be carried out especially advantageously by adding both reaction components in a molar ratio of 1:1 to a hydrogen peroxide rich reaction mixture and distilling off the percarboxylic acid over a small column. To provide for flexible operation it is advantageous to employ over 3% by weight of sulfuric acid, preferably 10 to 30%, based on the reaction mixture provided for the distillation.

It furthermore was surprisingly found that the water continuously introduced and produced by the reaction can be distilled off with the percarboxylic acid in such a way that the composition in the distillation sump remains constant or, in other words, the water introduced for the distillation distills off with the percarboxylic acid depending upon the load on the column and the refluxing conditions in the same quantity as it is introduced into the reacton mixture without hydrogen peroxide passing over into the distillate. It is therefore possible to obtain practically the theoretically expected yields of percarboxylic acid in the distillate from stoichiometric proportions of carboxylic acid and hydrogen peroxide. The quantity of water introduced by the more or less diluted hydrogen peroxide and carboxylic acid employed is of no conseqence. The limits as to concentration and dilution depend upon economic considerations as well as danger limits. Preferably, the quantity of water introduced by the hydrogen peroxide and carboxylic acid employed is such as to be equivalent of a mixture of about 25 to 95% aqueous hydrogen peroxide and anhydrous carboxylic acid.

As hydrogen peroxide and carboxylic acid are not lost during the distillation to the distillate, the conversion is quantitative and the yield almost 100%. Certain small losses in yield of peroxidic oxygen, as is known, depend upon the cleanness of the apparatus employed. They are of the order of 2–3%. It is therefore advantageous to use stabilizers which are known per se to prevent unnecessary losses of peroxidic oxygen. Polyphosphoric acids or phosphonic acids containing organic radicals, such as hydroxy ethane diphosphonic acid, are very effective for this purpose. In general, the presence of about 1% of stabilizer in the reaction mixture suffices.

In carrying out the process practically 10 mols of hydrogen peroxide in the form of an aqueous solution of 30 to 90% by weight and 1 mol of carboxylic acid such as acetic acid in concentrated form or as an aqueous solution are placed in a distillation vessel and 10–30% by weight of concentrated sulfuric acid based on the total mixture added thereto. This mixture is then brought to reflux in a small distillation column provided with a dephlegmator at a partial vacuum of about 20 to 100 mm. Hg. The temperature of the sump mixture depends upon the vacuum employed and correspondingly amounts to 20 to 80° C. After equilibrium has been reached distillate is taken off and a corresponding quantity of carboxylic acid and hydrogen peroxide in a molar ratio of 1:1 continuously added. The distillate consists of a mixture of water and percarboxylic acid and is completely free of carboxylic acid and hydrogen peroxide.

The process according to the invention because of the purity of the percarboxylic acid produced and also because of the possibility of producing relatively concentrated aqueous percarboxylic acids lends itself to the production of solutions of percarboxylic acids in water-immiscible or slightly miscible organic solvents. It's possible, for example, to distill off the water azeotropically with the aid of esters of acetic acid or propionic acid, such as ethyl acetate, propyl acetate or ethyl propionate, in a continuously operating rectification column and to draw off the solution of pure percarboxylic acid in the solvent concerned from the sump of such column.

The following examples will serve to illustrate several embodiments of the invention.

*Example 1*

680 g. (10 mols) of $H_2O_2$ 50% by weight, 60 g. (1 mol) of glacial acetic acid, 150 g. concentrated $H_2SO_4$ and 7 g. of 1-hydroxy ethane diphosphonic acid (stabilizer) were placed in a 1 liter flask provided with a filled column 1 meter high and 30 mm. in diameter and dephlegmator. The pressure of the system was adjusted to 45 mm. Hg and the temperature of the reaction mixture brought to 60° C. on a water bath. After a reflux had established in the column, distillate was taken off over a brine cooler and an average of a mixture of 48 g. $H_2O_2$ 50% by weight and 42.4 g. absolute acetic per hour were supplied to the distillation flask. An average of 90 g. distillate of a mixture of 59.3% by weight of peracetic acid and 40.7% by weight of water were taken off per hour.

The results obtained in 115 hours' operation are given in the following tables:

*Table 1*

| Substance | Provided at start, g. | Residue, g. | Supplied in 115 hours, g. | Distillate, g. |
|---|---|---|---|---|
| $H_2O_2$, abs | 340 | 288 | 2,760 | |
| Acetic acid | 60 | 18 | 4,876 | |
| $H_2SO_4$ | 150 | 150 | | |
| Stabilizer | 7 | 7 | | |
| Peracetic acid | 7 | 53 | | 6,094 |
| $H_2O$ | 340 | 308 | 2,760 | 4,183 |
| | 897 | 824 | 10,396 | 10,277 |
| G. Peroxidic oxygen | 160 | 146 | 1,299 | 1,283 |

*Table 2*

| Materials supplied | Grams | Materials obtained | Grams | Loss of that supplied | |
|---|---|---|---|---|---|
| | | | | Grams | Percent |
| Total quantities: | | | | | |
| Provided at start | 897 | Residue | 824 | | |
| Run in | 10,396 | Distillate | 10,277 | | |
| | 11,293 | | 11,101 | 192 | 1.7 |
| Peroxidic oxygen: | | | | | |
| Provided at start | 160 | Residue | 146 | | |
| Run in | 1,299 | Distillate | 1,283 | | |
| | 1,459 | | 1,429 | 30 | 2.0 |

A three necked 2 liter flask provided with a 1.5 meter high 40 mm. in diameter filled column and a brine cooled water separator was used for removal of water from the peracetic acid produced. The distillation flask was provided with an arrangement for removal of liquid under vacuum and two inlets were provided in the midsection of the filled column for introduction of the aqueous peracetic acid and ethyl acetate. 1500 g. of ethyl acetate and 0.6 g. of 1-hydroxy ethane diphosphonic acid as stabilizer were placed in the flask and brought to a reflux on a water bath at a pressure of 200 mm. Hg. Then an average of 100 g. per hour of the 59.3% by weight aqueous peracetic acid solution produced introduced into the midsection of the column until the desired peracetic acid concentration was reached in the sump. Thereafter 250 g. ethyl acetate and 0.1 g. of 1-hydroxy ethane diphosphonic acid were supplied per hour simultaneously with the aqueous peracetic acid and 298 g. per hour of the 20% solution of peracetic acid in ethyl acetate withdrawn from the sump. The water which separated out in the separator was also continuously withdrawn.

The results given in the following Table 3 were obtained over 100 hours' withdrawl of the peracetic acid solution in ethyl acetate from the sump.

*Table 3*

| | Sump start, g. | Sump after 106 hrs. | Produced, g. during 106 hrs. | Taken off, g. in 100 hrs. | Losses | |
|---|---|---|---|---|---|---|
| | | | | | Grams | Percent |
| Ethyl acetate | 1,500 | 1,425 | 25,000 | 23,570 | 1,325 | 5 |
| Stabilizer | 0.6 | 0.6 | 10 | 10 | 0 | 0 |
| Peracetic acid | 0 | 349 | 6,286 | [1] 5,812 | 125 | 1.98 |
| $H_2O$ | 0 | 0 | 4,314 | | | |
| Totals | 1,500.6 | 1,774.6 | | | | |

[1] In 106 hrs.

EXAMPLE 2

986.0 g. of aqueous $H_2O_2$ (50% by weight), 107 g. of propionic acid (100%), 219 g. of concentrated sulfuric acid and 10.9 g. of 1-hydroxy ethane diphosphonic acid (stabilizer) were placed in a circulating evaporator of 1.5 liters capacity provided with a filled column 1.8 meters high and 30 mm. in diameter and dephlegmator. The mixture was heated to boiling at a pressure of 45 torrs and after equilibrium was established in the column, distillate was taken off. Simultaneously an average of a mixture of 136.8 g. of aqueous 33.5% by weight $H_2O_2$ and 99.8 g. of propionic acid (100%) per hour was supplied to the evaporator. An average of 228.6 g. of pure aqueous propionic acid were taken off per hour as the distillate. The distillate consisted of 51.5% by weight of perpropionic acid and 48.5% of water.

The results obtained in 162.5 hours' operation are given in the following tables:

*Table 4*

| Substance | Provided at start, g. | Residue, g. | Supplied in 162.5 hours, g. | Distillate, g. |
|---|---|---|---|---|
| $H_2O_2$ (100%) | 493.0 | 449.0 | 7,446 | |
| Propionic acid | 107.5 | 11.6 | 16,224 | |
| $H_2SO_4$ | 219.0 | 219.0 | | |
| Stabilizer | 10.9 | 10.9 | | |
| Perpropionic acid | | 64.8 | | 19,135 |
| Water | 493.0 | 484.7 | 14,783 | 18,021 |
| | 1,323.4 | 1,240.0 | 38,453 | 37,156 |
| G. Peroxidic oxygen | 232.0 | 222.6 | 3,504 | 3,401 |

*Table 5*

| Materials supplied | Grams | Materials obtained | Grams | Loss of that supplied | |
|---|---|---|---|---|---|
| | | | | Grams | Percent |
| Total quantities: | | | | | |
| Provided at start | 1,323.4 | Residue | 1,240.0 | | |
| Run in | 38,453.0 | Distillate | 37,156.0 | | |
| | 39,776.4 | | 38,396.0 | 1,380.4 | 3.5 |
| Peroxidic oxygen: | | | | | |
| Provided at start | 232.0 | Residue | 222.6 | | |
| Run in | 3,504.0 | Distillate | 3,401.0 | | |
| | 3,736.0 | | 3,623.6 | 112.4 | 3.0 | apparatus as in Example 1 and distilled under a pressure of 45 torrs. An average of 197.7 g. of distillate consisting of 42.7% by weight of per-n-butyric acid and 57.3% by weight of water was taken off per hour. Simultaneously 129.5 g. of aqueous $H_2O_2$ (22.15% by weight) and 76.2 g. of n-butyric acid (100%) were supplied to the evaporator per hour.

The results obtained in 210 hours' operation are given in the following tables:

*Table 6*

| Substance | Provided at start, g. | Residue, g. | Supplied in 210 hours, g. | Distillate, g. |
|---|---|---|---|---|
| $H_2O_2$ (100%) | 469.0 | 369.0 | 6,025 | |
| n-Butyric acid | 121.5 | 16.2 | 16,007 | |
| $H_2SO_4$ | 212.0 | 212.0 | | |
| Stabilizer | 10.6 | 10.6 | | |
| Per-n-butyric acid | | 114.0 | | 17,729 |
| Water | 469.0 | 402.2 | 21,175 | 23,790 |
| | 1,282.1 | 1,124.0 | 43,207 | 41,519 |
| G. Peroxidic oxygen | 220.8 | 191.0 | 2,835.2 | 2,727.5 |

*Table 7*

| Material supplied | Grams | Materials obtained | Grams | Loss of that supplied | |
|---|---|---|---|---|---|
| | | | | Grams | Percent |
| Total quantities: | | | | | |
| Provided at start | 1,282.1 | Residue | 1,124.0 | | |
| Run in | 43,207.0 | Distillate | 41,519.0 | | |
| | 44,489.1 | | 42,643.0 | 1,846.1 | 4.1 |
| Peroxidic oxygen: | | | | | |
| Provided at start | 220.8 | Residue | 191.0 | | |
| Run in | 2,835.2 | Distillate | 2,727.5 | | |
| | 3,056.0 | | 2,918.5 | 137.5 | 4.5 |

EXAMPLE 3

938.0 g. of aqueous $H_2O_2$ (50% by weight), 121.5 g. of n-butyric acid (100%), 212 g. of concentrated $H_2SO_4$ and 10.6 g. of 1-hydroxy diphosphonic acid were placed in an

EXAMPLE 4

944.0 g. of aqueous $H_2O_2$ (50% by weight), 122 g. of isobutyric acid (100%), 213.0 g. concentrated $H_2SO_4$ and 10.6 g. of 1-hydroxy diphosphonic acid were placed in an apparatus as in Example 1 and distilled under a pressure of 45 torrs. An average of 214.2 g. of distillate consisting of 57% by weight of per-isobutyric acid and 43% by weight of water was taken off per hour. Simultaneously 111.7 g. of $H_2O_2$ (36.3% by weight) and 105 g. of isobutyric acid (100%) were supplied to the evaporator per hour. The results obtained in 177.5 hours' operation are given in the following tables:

Table 8

| Substance | Provided at start, g. | Residue, g. | Supplied in 177.5 hours, g. | Distillate, g. |
|---|---|---|---|---|
| $H_2O_2$ (100%) | 472.0 | 368.0 | 7,197 | |
| Isobutyric acid | 122.0 | 76.0 | 18,651 | |
| $H_2SO_4$ | 213.0 | 213.0 | | |
| Stabilizer | 10.6 | 10.6 | | |
| Per-i-nutyric acid | | 74.0 | | 21,670 |
| Water | 472.0 | 578.4 | 12,629 | 16,347 |
| | 1,389.6 | 1,320.0 | 38,477 | 38,017 |
| G. Peroxidic oxygen | 222.1 | 184.6 | 3,387.0 | 3,330.7 |

Table 9

| Materials supplied | Grams | Materials obtained | Grams | Loss of that supplied | |
|---|---|---|---|---|---|
| | | | | Grams | Percent |
| Total quantities: | | | | | |
| Provided at start | 1,389.6 | Residue | 1,320.0 | | |
| Run in | 38,477.0 | Distillate | 38,017.0 | | |
| | 39,866.6 | | 39,337.0 | 529.6 | 1.3 |
| Peroxidic oxygen: | | | | | |
| Provided at start | 222.1 | Residue | 184.6 | | |
| Run in | 3,387.0 | Distillate | 3,330.7 | | |
| | 3,609.1 | | 3,515.3 | 93.8 | 2.6 |

I claim:
1. In a process for producing an aqueous solution of a lower aliphatic monopercarboxylic acid including the reaction of the corresponding aliphatic monocarboxylic acid and hydrogen peroxide in the liquid phase in the presence of water and an acid catalyst, the steps of reacting the monocarboxylic acid and hydrogen peroxide in the presence of water and the catalyst at a temperature between about 20 and 80° C. while maintaining a molar ratio of hydrogen peroxide to monocarboxylic acid in the reaction mixture between about 5:1 and 15:1 and distilling the monopercarboxylic acid produced off from the reaction mixture together with water at a temperature between about 20 and 80° C. to obtain an aqueous solution of the pure monopercarboxylic acid.

2. In a process for producing an aqueous solution of peracetic acid by the reaction of acetic acid and hydrogen peroxide in the liquid phase in the presence of water and an acid catalyst, the steps of reacting the acetic acid and hydrogen peroxide in the presence of water and the catalyst at a temperature between about 20 and 80° C. while maintaining a molar ratio of hydrogen peroxide to acetic acid in the reaction mixture between about 5:1 and 15:1 and distilling the peracetic acid produced off from the reaction mixture together with the water at a temperature between about 20 and 80° C. to obtain an aqueous solution of pure peracetic acid.

3. The process of claim 1 in which sulfuric acid is employed as the catalyst in a quantity of 10 to 30% by weight of the reaction mixture.

4. In a process for producing an aqueous solution of a lower aliphatic monopercarboxylic acid including the reaction of the corresponding aliphatic monocarboxylic acid and hydrogen peroxide in the liquid phase in the presence of water and an acid catalyst, the steps of providing a mixture of hydrogen peroxide, the monocarboxylic acid, water and the acid catalyst in which the molar ratio of hydrogen peroxide to monocarboxylic acid is between about 5:1 and 15:1, continuously distilling off the monopercarboxylic acid produced together with water from the reaction mixture and continuously replenishing the reaction mixture only with hydrogen peroxide, the monocarboxylic acid and water to replace the hydrogen peroxide and monocarboxylic acid consumed and withdrawn and water withdrawn by distilling off the monopercarboxylic acid.

5. The process of claim 4 in which the reaction is carried out at a temperature between about 20 and 80° C.

6. The process of claim 4 in which said monopercarboxylic acid is peracetic acid and said monocarboxylic acid is acetic acid.

References Cited by the Examiner

UNITED STATES PATENTS

| | | | |
|---|---|---|---|
| 2,490,800 | 12/1949 | Greenspan | 260—502 |
| 2,814,641 | 7/1956 | Phillips et al. | 260—502 |
| 2,806,045 | 9/1957 | Gross | 260—502 |
| 2,813,896 | 11/1957 | Krimm | 260—502 |
| 2,877,266 | 3/1959 | Korach | 260—502 |
| 3,169,986 | 2/1965 | Webb et al. | 260—502 |

FOREIGN PATENTS 194,836  1/1958  Austria.

LORRAINE WEINBERGER, *Primary Examiner.*

LEON ZITVER, *Examiner.*

B. M. EISEN, M. WEBSTER, *Assistant Examiners.*